April 9, 1957   F. J. HENGEHOLD   2,787,891
COMBINED REFRIGERATOR AND COOKING PAN
Filed Nov. 14, 1955

Ferd J. Hengehold
INVENTOR.

BY
Attorneys

United States Patent Office 2,787,891
Patented Apr. 9, 1957

2,787,891

COMBINED REFRIGERATOR AND COOKING PAN

Ferd J. Hengehold, Cincinnati, Ohio

Application November 14, 1955, Serial No. 546,489

4 Claims. (Cl. 62—80)

The present invention relates to new and useful improvements in food containers and more particularly to a combined refrigerated and cooking pan.

An important object of invention is to provide a food container having self-contained refrigerating means therein to maintain food in the container at a relatively low temperature and wherein the food container with the refrigeration means and the food therein is placed in an oven for cooking the food. The invention is designed for placing a completely refrigerated meal in an automatic oven and the food kept refrigerated for a predetermined number of hours until the automatic timer for the oven is turned on to cook the food.

Another object of the invention is to provide a combined refrigerated and cooking pan having a plurality of food containers for holding various types of food to be cooked and maintained in a refrigerated condition for a predetermined length of time by one or more brine tanks and also placing one or more ice trays or containers in the pan to initially aid in maintaining the food in a refrigerated condition and wherein the ice in the ice trays becomes melted when subjected to heat and from which steam is generated for use in cooking the food.

A still further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
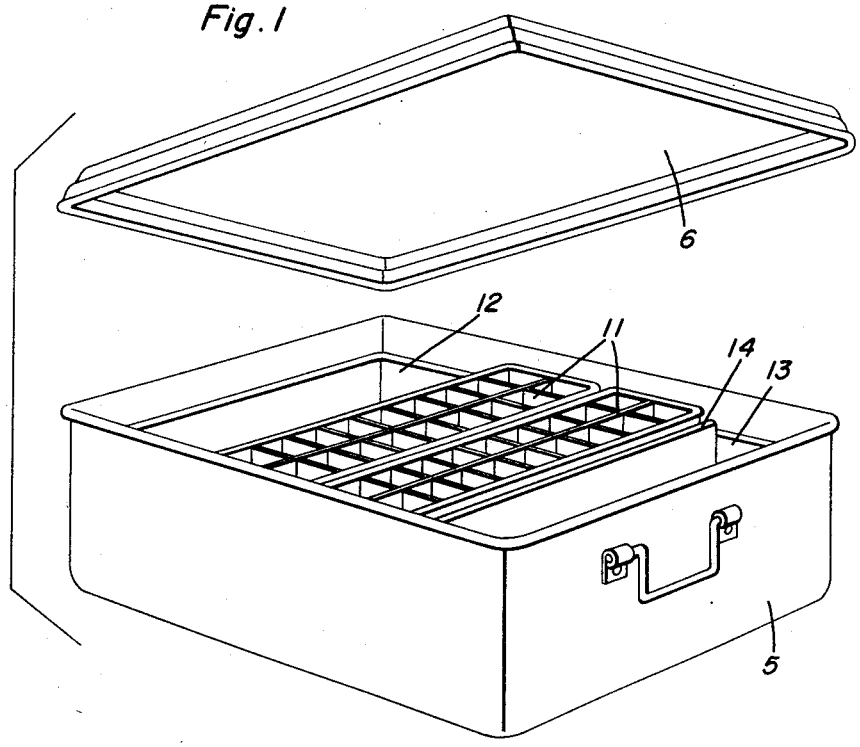
Figure 1 is a perspective view.
Figure 2:
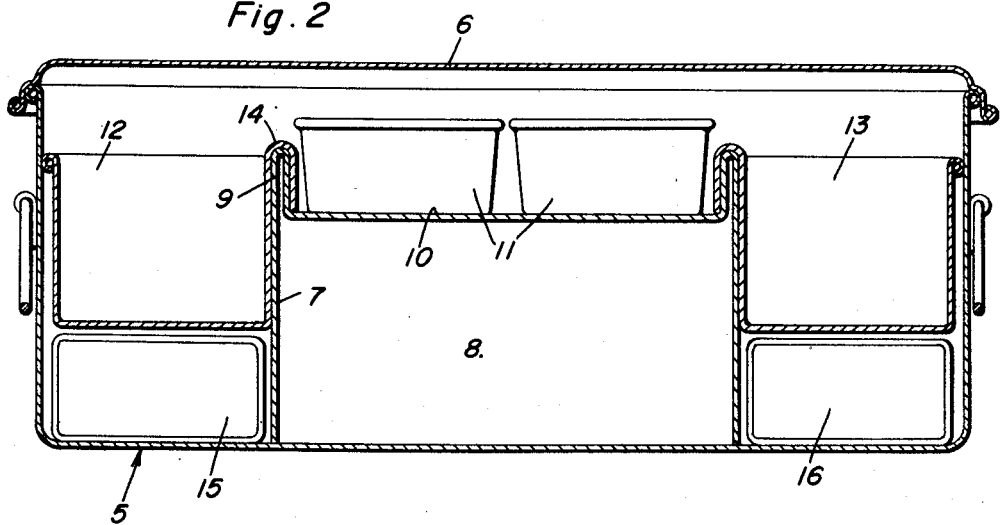
Figure 2 is a longitudinal sectional view.

Referring now to the drawing in detail wherein for the purpose of illustration I have disclosed a preferred embodiment of the invention, the numeral 5 designates a combined refrigerated and cooking pan which is closed by a removable lid or cover 6.

An inverted substantially U-shaped sheet metal rack 7 is placed in the pan 5 to provide a bottomless food compartment 8.

The upper sde edges of the rack 7 is formed with upstanding lips or flanges 9 to form a recess 10 at the top of the rack and upon which a pair of ice trays 11 may be placed.

A pair of open food containers 12 and 13 are formed at one upper ege with a downwardly projecting hanger hook 14 adapted for engagement over the upstanding lip or flange 9 of the rack 7 to support the containers in an elevated position above the bottom of the pan 6 and at each end of the rack 7.

Salt brine tanks 15 and 16 are placed in the bottom of the pan 5 under each of the food containers 12 and 13.

In the operation of the device the salt brine tanks 15 and 16 are chilled in any conventional manner to a desired below freezing temperature and the refrigerated tanks 15 and 16 are then placed in the pan 5. A roast is placed in the pan and over which the rack 7 is placed to separate the roast from the brine tanks. Vegetables to be cooked are then placed in the containers 12 and 13 and the latter suspended from the upstanding lips or flanges 9 by the hanger hooks 14. The ice trays 11 with ice cubes therein are then placed on the top 10 of the rack 7 and the lid 6 placed in position.

The pan 5 with the aforesaid contents therein may then be placed in an automatic oven or other automatic cooking device and the timer for the oven set to be turned on following a desired interval. The food contained in the pan 5 and containers 12 and 13 will be maintained in their refrigerated condition for a predetermined period of time and when subjected to heat by the oven the brine tanks will become heated and which in turn will melt the ice in the ice trays 11 to generate steam and thus serve to cook the roast in the compartment 8 as well as to cook the vegetables in the containers 12 and 13.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A food container comprising a pan having a lid, a removable bottomless chamber resting on the bottom of the pan, an upstanding lip at the upper edge of the chamber, an open receptacle, and a hanger member at the upper portion of the receptacle engaging the lip to detachably support the receptacle at one side of the chamber.

2. A combined refrigerated and cooking container comprising in combination, a pan having a lid, a removable bottomless chamber resting on the bottom of the pan, a water pan on top of the chamber, an open cooking receptacle, means detachably supporting the receptacle in an elevated position in the pan at one side of the chamber, and a refrigeration receptacle under the cooking receptacle.

3. A combined refrigerated and cooking container comprising in combination, a pan having a lid, a removable bottomless chamber resting on the bottom of the pan, a water pan on top of the chamber, an open cooking receptacle, means detachably supporting the receptacle in an elevated position in the pan at one side of the chamber, and a brine tank under the cooking receptacle.

4. The construction of claim 3 wherein said chamber comprises an inverted U-shaped rack.

References Cited in the file of this patent

UNITED STATES PATENTS

| | | |
|---|---|---|
| 947,373 | Coleman | Jan. 25, 1910 |
| 1,948,932 | McMickle | Feb. 27, 1934 |